US010111549B2

(12) United States Patent
Nally

(10) Patent No.: US 10,111,549 B2
(45) Date of Patent: Oct. 30, 2018

(54) STAND

(71) Applicant: Larry L. Nally, Hagerstown, MD (US)

(72) Inventor: Larry L. Nally, Hagerstown, MD (US)

( * ) Notice: Subject to any disclaimer, the term of this patent is extended or adjusted under 35 U.S.C. 154(b) by 56 days.

(21) Appl. No.: 14/717,497

(22) Filed: May 20, 2015

(65) Prior Publication Data

US 2015/0335189 A1 Nov. 26, 2015

Related U.S. Application Data

(60) Provisional application No. 62/001,360, filed on May 21, 2014.

(51) Int. Cl.
*A47G 33/04* (2006.01)
*A47G 33/12* (2006.01)
*F16M 11/16* (2006.01)

(52) U.S. Cl.
CPC ......... *A47G 33/1226* (2013.01); *F16M 11/16* (2013.01); *A47G 2033/1286* (2013.01)

(58) Field of Classification Search
CPC .......... A01G 9/12; A47G 33/04; A47G 33/06; A47G 33/12; A47G 33/1226
USPC .......................................................... 47/40.5
See application file for complete search history.

(56) References Cited

U.S. PATENT DOCUMENTS

| 3,661,349 A * | 5/1972 | De Vries | A47G 33/1213 |
| | | | 248/179.1 |
| 3,715,095 A * | 2/1973 | Drablowski | A47G 33/12 |
| | | | 248/515 |
| 4,913,395 A * | 4/1990 | Juhas | A47G 33/1226 |
| | | | 248/516 |
| 5,301,462 A * | 4/1994 | Hronyetz | A47G 33/1226 |
| | | | 248/521 |
| 5,393,031 A * | 2/1995 | Leve | A47G 33/1226 |
| | | | 248/516 |
| 5,398,444 A * | 3/1995 | Murray | A47G 33/1226 |
| | | | 248/515 |
| 5,938,168 A * | 8/1999 | Adams | A47G 33/12 |
| | | | 248/523 |
| 6,019,341 A * | 2/2000 | Brown | A47G 33/1213 |
| | | | 248/516 |
| 2005/0257422 A1* | 11/2005 | Hronyetz | A47G 33/1226 |
| | | | 47/40.5 |
| 2013/0140421 A1* | 6/2013 | Hammond | A47G 33/1226 |
| | | | 248/523 |

* cited by examiner

*Primary Examiner* — Monica L Williams
*Assistant Examiner* — Aaron M Rodziwicz
(74) *Attorney, Agent, or Firm* — Maier & Maier, PLLC

(57) ABSTRACT

A stand may be provided. The stand may include a base portion. The base portion may be a hollow cylinder with an open top, capable of retaining liquid. The base portion may also have support legs extending therefrom. There may be brace members situated within the base portion that may form a socket for receiving a securing portion. The securing portion may be able to rotate and tilt within the socket formed by the brace members. The securing portion may be a hollow sphere with receiving aperture defined by an open ended cylinder extending therefrom. There may be locking members for locking the securing portion in a desired orientation and there may be fastening members for securing an object within the securing portion.

9 Claims, 5 Drawing Sheets

STAND

CROSS-REFERENCE TO RELATED APPLICATIONS

This application claims priority to U.S. Provisional Patent Application No. 62/001,360 filed May 21, 2014, and entitled STAND, the entire contents of which are hereby incorporated by reference.

BACKGROUND

Stands are often used to brace an object in a desired orientation. A particular object that is often supported or braced by a stand is a tree. In certain situations, decorative trees may have been removed from the ground, requiring them to be supported by a stand. Often natural trees do not have straight trunks and therefore can be difficult to orient desirably in a stand. Additionally, adjustment of an objects orientation once supported by a stand may be desirable.

SUMMARY

According to an exemplary embodiment, a stand may be provided. The stand may include a hollow, cylindrical base portion having a side wall, a bottom member, and an open top. The base portion may have at least one support leg extending therefrom. The stand may also include a securing portion, which may include a hollow sphere with a cylindrical collar defining a receiving aperture. There may be at least one brace member disposed within the base portion, which may be capable of forming a socket for receiving a securing portion. There may further be at least one locking member, which may lock the securing portion in a desired orientation within the socket. Finally, there may be at least one fastening member, which may secure an object within the securing portion.

According to another exemplary embodiment, a stand may be provided. The stand may include a base portion and a securing portion. The securing portion may be disposed substantially within the base portion and may be capable of securing and supporting an object. The orientation of the securing portion may be adjustable by rotating or tilting within the base portion.

BRIEF DESCRIPTION OF THE FIGURES

Advantages of embodiments of the present invention will be apparent from the following detailed description of the exemplary embodiments. The following detailed description should be considered in conjunction with the accompanying figures in which:

Exemplary FIG. 1 may show an exemplary embodiment of a stand;

Figure 1:
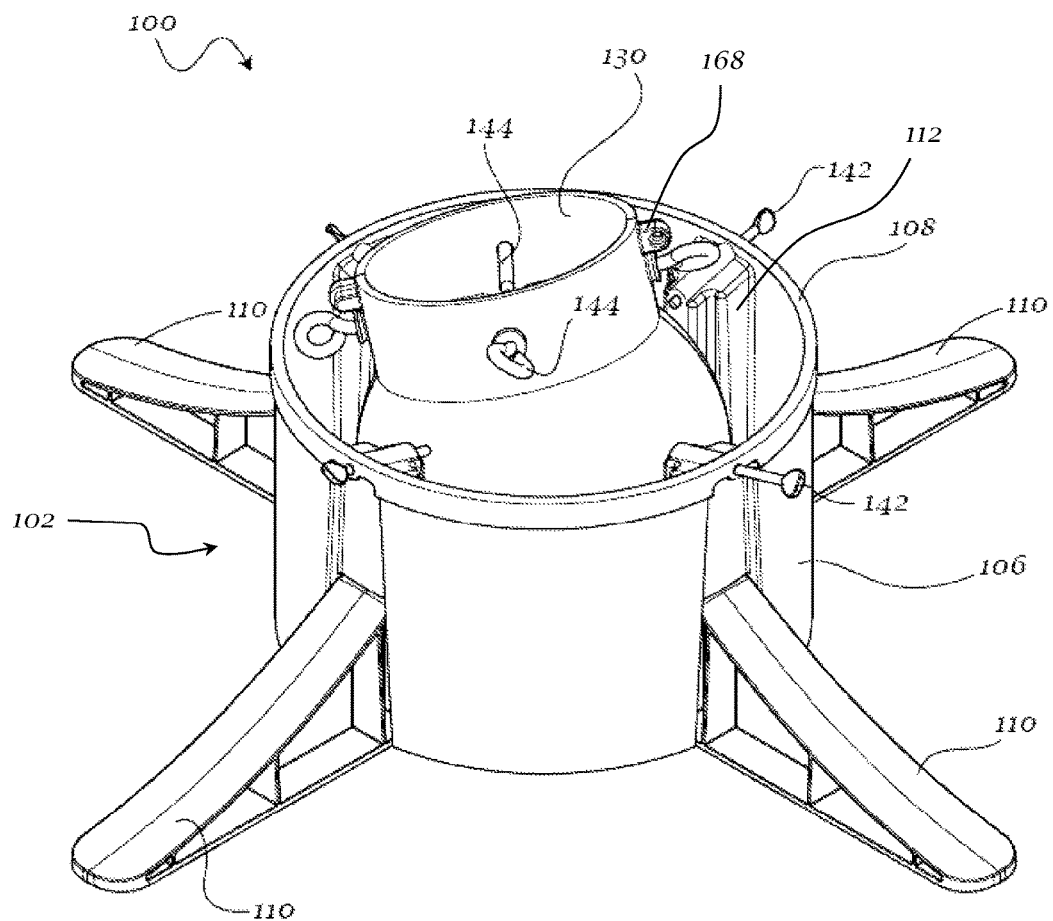
Figure 2A:
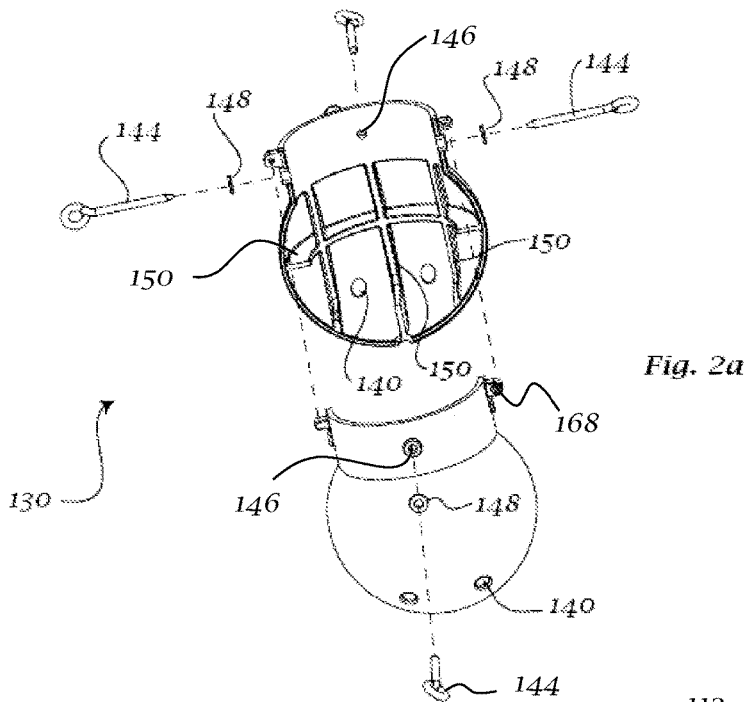
Figure 2B:
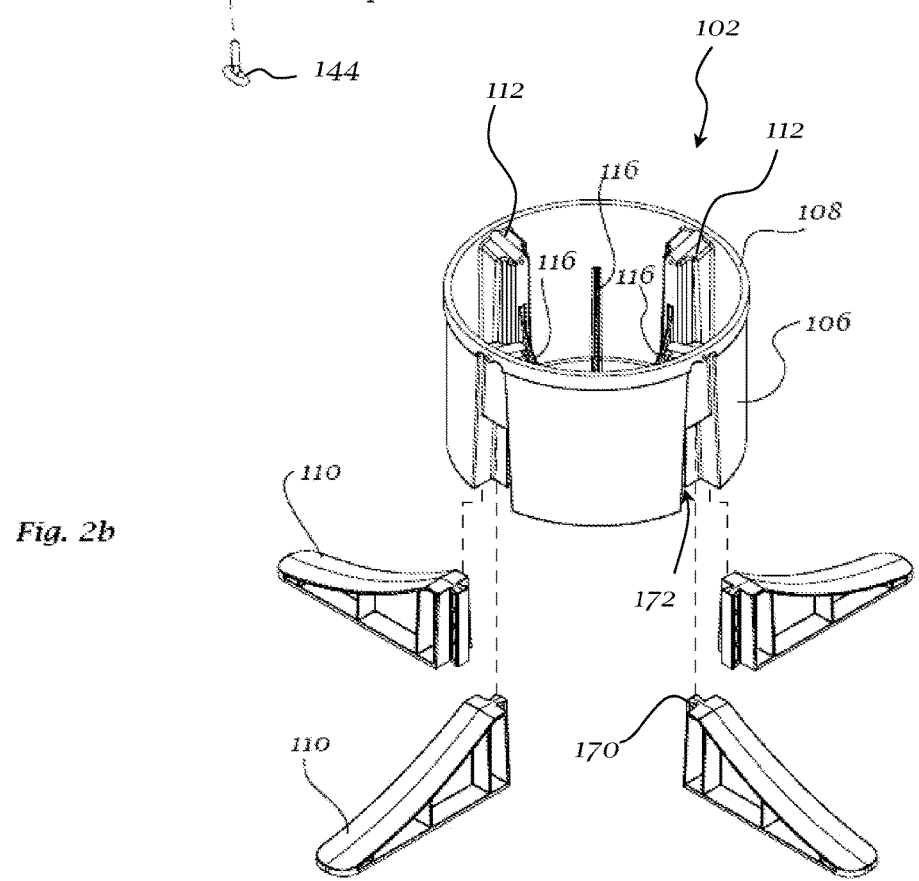
Figure 2C:
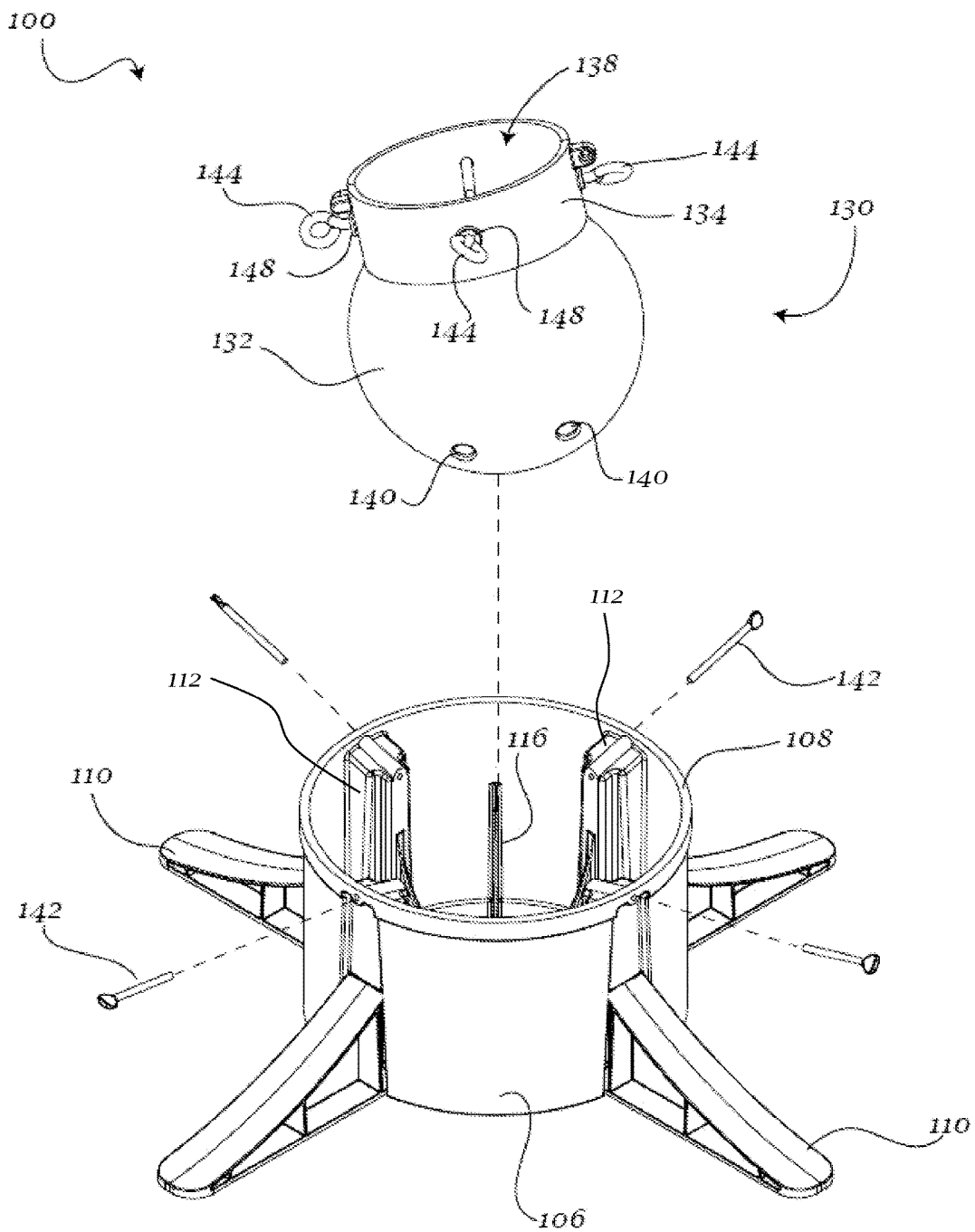
Figure 3:
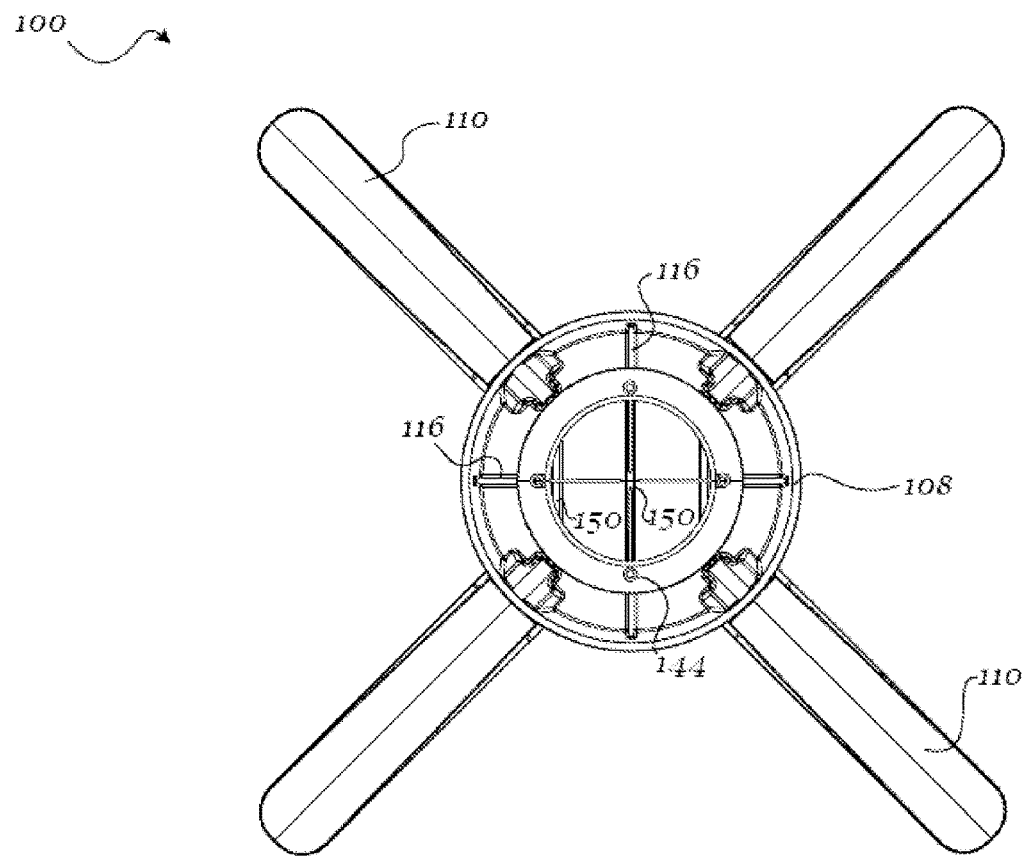
Figure 4:
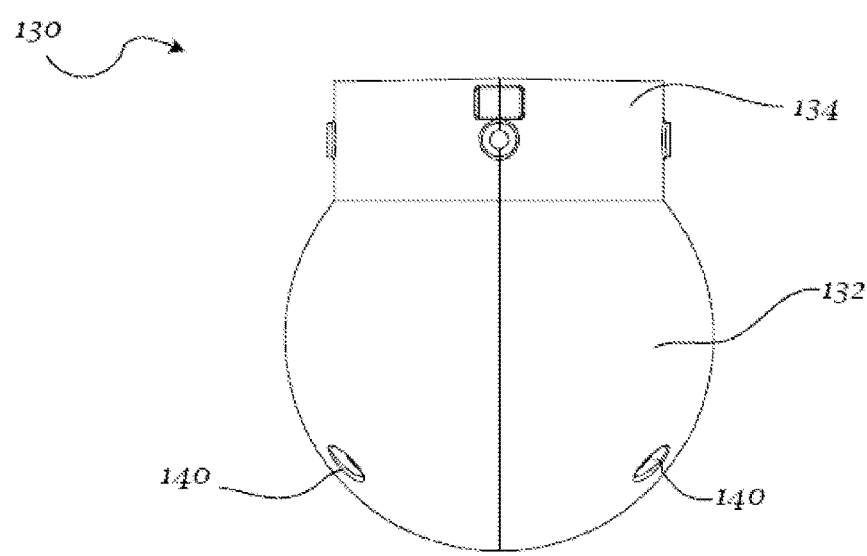
Figure 5:
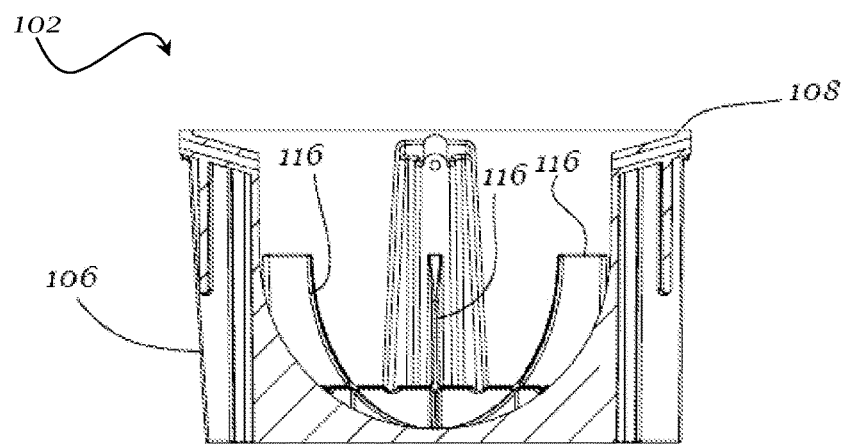
Figure 6:
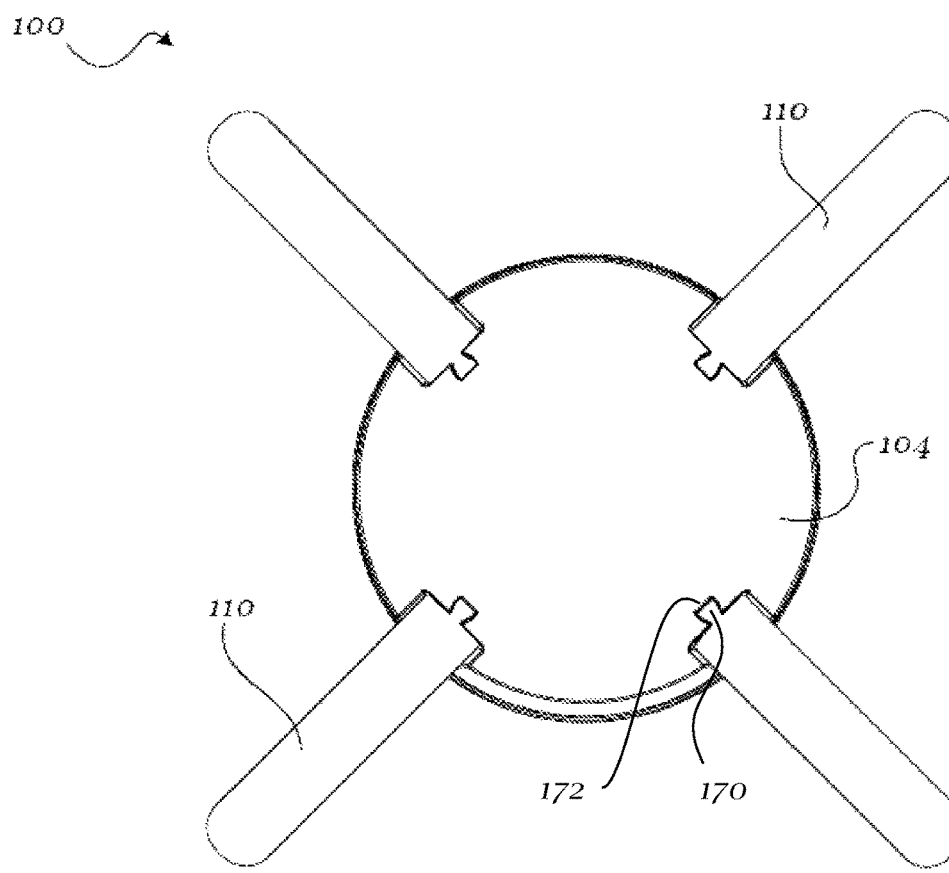

Exemplary FIG. 2A may show cross-sectional, exploded view of a securing portion;

Exemplary FIG. 2B may show an exploded view of a base portion;

Exemplary FIG. 2C may show an exploded view of a stand;

Exemplary FIG. 3 may show a top plan view of a stand;

Exemplary FIG. 4 may show an elevation view of a securing portion;

Exemplary FIG. 5 may show a cross-sectional elevation view of a base portion; and Exemplary FIG. 6 may show a bottom plan view of a stand.

DETAILED DESCRIPTION

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Moreover, the terms "embodiments of the invention", "embodiments" or "invention" do not require that all embodiments of the invention include the discussed feature, advantage or mode of operation.

According to at least one exemplary embodiment, a stand may be disclosed. The stand may include a base portion, a trunk securing portion, and support legs. The stand may allow an object, such as a tree, to be secured in a desired orientation. The stand may be made of wood, rubber, metal, plastic, polymers, or any combination thereof.

Referring to the figures generally, a stand 100 may have a base portion 102. An exemplary embodiment of base portion 102 may be a substantially cylindrical bucket. Base portion 102 may have a substantially circular bottom member 104 and a substantially cylindrical sidewall 106 extending up from the perimeter of bottom member 104. The edge of sidewall 106 opposite bottom member 104 may create a top lip 108 defining an open top of base portion 102. In an exemplary embodiment, sidewall 106 and bottom member 104 may form a base portion 102 capable of holding liquid. Base portion 102 may have at least one support leg 110 extending therefrom. In an exemplary embodiment, base portion 102 may have four support legs 110 extending therefrom. Support legs 110 may be symmetrically disposed about base portion 102. Support legs 110 may provide wider points of contact with a floor surface to increase stability.

Within base portion 102 there may be at least one brace member 116. There may also optionally be at least one leg receiving slot indentation 112. Indentations 112 may be used in conjunction with brace members 116. Brace members 116 and receiving slot indentations 112 may project a distance into base portion 102 from sidewall 106. In some exemplary embodiments, brace members 116 may be affixed to a bottom member 104 and an interior surface of leg receiving slot indentations 112 or sidewall 106. In some exemplary embodiments, brace members 116 may be substantially planar. Brace members 116 and receiving slot indentations 112 may be configured to form a substantially U-shaped socket for receiving a securing portion 130. Securing portion 130 and brace members 116 may substantially form a ball and socket type joint. Brace members 116 may form substantially U-shaped inner faces, which may be substantially vertical and gradually curve toward the center of base portion 102, forming an intersection at the center. The curve of brace members 116 may be configured to match an outer surface of trunk securing portion 130. In some embodiments, a top edge of indentations 112 may be sloped or tapered so as to allow trunk securing portion 130 more maneuverability within the socket formed by brace members 116 and indentations 112.

Securing portion 130 may be removably disposed within an interior of base 102. Trunk securing portion 130 may have a hollow, substantially spherical section 132 with a hollow cylindrical section 134 extending therefrom. The perimeter formed where cylindrical section 134 joins substantially spherical section 132 may define a receiving aperture 138 in substantially spherical section 132. Hollow cylindrical section 134 may include a sidewall and may be open on both ends. Therefore, receiving aperture 138 may extend through cylindrical section 134, allowing the hollow interior of substantially spherical section 132 to be reached through cylindrical section 134. In an exemplary embodiment, at least one aperture 140 may be disposed in trunk securing portion 130. At least one aperture 140 may be disposed in substantially spherical section 132. The at least one aperture 140 may be disposed substantially opposite receiving aperture 138. An exemplary embodiment may have four additional apertures 140 disposed in a portion of spherical section 132 distal receiving aperture 138. Apertures 140 may allow the contents of base portion 102 and securing portion 130 to interact when securing portion 130 is disposed within base portion 102. For example, apertures 140 may allow a tree trunk disposed in securing portion 130 to interact with water in base 102. Receiving aperture 138 may allow an object, such as a tree trunk, to be inserted in securing portion 130. Bracing members 150 may be disposed within securing portion 130 to provide a contact surface for an inserted object. The bracing members 150 may create contact surfaces within the substantially hollow sphere of securing portion 130. The contact surfaces may include a contiguous or intermittent bottom surface and a contiguous or intermittent sidewall surface. In some exemplary embodiments, securing portion may include two halves secured together. An exemplary dividing line may run symmetrically through the receiving aperture 138, such that each half includes a portion of the spherical portion 132 and the cylindrical collar 134. The halves may also include securing slots 168, which may protrude from cylindrical collar portions 134 and may be capable of being secured together by a bolt or similar fastener. Each half may further include a tongue or corresponding groove along the adjoining surfaces to facilitate alignment and securing of the halves together.

In an exemplary embodiment, at least one fastening member 144 may be provided for securing an object in securing portion 130. Fastening member 144 may include screws, bolts, clamps, hose clamps, etc. Fastening member 144 may be configured to constrict on the object uniformly. Fastening member 144 may be two parts configured to constrict in unison. In one embodiment, fastening means may include eye screws. In an exemplary embodiment, fastening member 144 may include four eye screws. The eye screws may project into hollow cylindrical section 134 through fastening apertures 146 in cylindrical section 134. Washers 148 may be used to prevent the heads of the eye screws from contacting cylindrical section 134.

Securing portion 130 may be inserted in base portion 102 such that spherical section 132 rests in the socket formed by support members 112. This may substantially form a ball-socket. Cylindrical section 134 may project through the open top of base 102. Securing portion 130 may rotate or tilt within the socket of support members 112. The movement of securing portion 130 may be limited by the interaction of cylindrical portion 134 and support members 112. In embodiments where a top edge of support members 112 is tapered, additional range of movement of securing portion 130 may be allowed.

Stand 100 may additionally include locking members 142 for locking securing portion 130 in a desired orientation. The locking members 142 may include bolts, screws, clamps, etc. In an exemplary embodiment, the locking members 142 may be disposed through at least one of sidewall 106 and indentations 112. Locking members 142 may be configured to project into the socket formed by indentations 112 and brace members 116. In embodiments with threaded locking members 142, disposition of locking members 142 through sidewall 106 and indentations 112 may result in threaded communication, allowing locking members 142 to move into or be extracted from the socket by rotation. When inserted into the socket, locking members 142 may come in contact with securing portion 130. Securing portion 130 may be locked in a particular orientation when pressure is applied on securing portion 130 from locking members 142.

Some embodiments of support legs 110 may have a bottom surface that extends along the same plane as base portion bottom surface 104. In some embodiments, support legs 110 may be removably attached to base portion 102. Base portion 102 and support legs 110 may have corresponding attachment members. In some embodiments, the attachment members may create a dovetail type attachment. Support legs 110 may have a dovetailed edge 170 that slides into corresponding receiving slots 172 disposed around base portion 102. Support legs 110 may also be attached with glue, screws, bolts, clamps, and other fasteners, as would be reasonably understood by a person having ordinary skill in the art. Alternatively, support legs 110 may be formed integrally with base portion 102.

An exemplary embodiment of stand 100 may operate as follows. An object, such as a tree trunk, may be inserted into securing portion 130, until it rests on the interior surface or bracing members 150 of securing portion 130. Fastening member(s) 144 may secure the object within securing portion 130. An object may be securing in securing portion 130 when securing portion 130 is disposed within base portion 102. Alternatively, securing portion 130 may be secured to an object and then inserted into base portion 102. The ability of securing portion 130 to rotate and tilt within base portion 102 may allow the object to be oriented in a variety of positions, and it may also accommodate an object with a crooked end. Tree trunks, for example, may not be perfectly straight, yet they are often expected to stand straight when displayed in a stand. Often to accommodate trees with crooked trunks, the crooked portion must be cut off, shortening the useful portion of the tree. The movement ability of securing portion 130 may additionally allow for subsequent adjustments to the orientation of an object supported in stand 100. Securing portion 130 may be locked at a desired orientation by locking members 142.

Stand 100 may support a variety of objects other than trees, such as sports nets or goals. In such embodiments, trunk securing portion 130 may receive and secure objects including poles. Stand 100 may also be portable. For embodiments configured to hold living objects or objects requiring contact with a substance, the substance, such as water, may be held in base portion 102. An exemplary embodiment may hold approximately 1.5 gallons of water. Apertures 140 disposed in securing portion 130 may allow interaction between the object and the substance held in base portion 102. Base portion 102 may also be filled with a substance to provide stability. Adding a substance, such as sand or water, to base portion 102 may provide stability by adding weight to the stand.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A stand comprising:
    a hollow, cylindrical base portion having a side wall, a bottom member and an open top;
    at least one support leg extending from the base portion;
    a securing portion, the securing portion being a singularly formed hollow sphere with a cylindrical collar formed with the hollow sphere defining a receiving aperture, the securing portion having a lower end and an upper end, wherein a hemisphere of the hollow sphere is disposed at the lower end of the securing portion and the cylindrical collar is disposed at the upper end of the securing portion;
    a plurality of brace members disposed within the base portion configured to form a socket for receiving a securing portion so that the securing portion rests on the plurality of brace members disposed on an interior wall of the base portion, the plurality of brace members comprising protrusions disposed radially around an inner circumference of the base portion, each of the plurality of brace members having a height dimension, a length dimension aligned with a radius of the base portion, and a width dimension smaller than the height dimension and the length dimension;
    at least one locking member configured to lock the securing portion is a desired orientation within the socket; and
    at least one fastening member disposed on the collar configured to secure an object within the securing portion.

2. The stand of claim 1, further comprising a plurality of apertures disposed in the sphere of the securing portion substantially opposite the receiving aperture.

3. The stand of claim 1, wherein the at least one support leg is removably affixed to the base portion.

4. The stand of claim 1, wherein the base portion is configured to retain liquid.

5. The stand of claim 1, wherein the socket is configured to allow the securing portion to rotate and tilt, and wherein the securing portion is rotatable within the socket, around a center point of the hollow sphere, to a position wherein the cylindrical collar is in contact with at least one support member.

6. The stand of claim 1, further comprising at least one fastening member aperture disposed in the cylindrical collar of the securing portion for receiving a fastening member configured to secure an object within the securing portion.

7. The stand of claim 1, further comprising at least one locking member aperture disposed in the base portion for receiving a locking member configured to lock the securing portion in a desired orientation within the base portion.

8. The stand of claim 7, wherein the at least one locking member aperture passes through a side wall and at least one brace member of the base portion.

9. The stand of claim 1, further comprising at least one support leg receiving slot indentation, the support leg receiving slot indentation having a dovetail shape.

* * * * *